(12) United States Patent
Schroeder et al.

(10) Patent No.: US 6,192,935 B1
(45) Date of Patent: Feb. 27, 2001

(54) DISPENSING VALVE MOUNTING ASSEMBLY

(75) Inventors: Alfred Augustus Schroeder, San Antonio; Craig Cloud, New Braunfels; Adrian Michael Romanyszyn, San Antonio, all of TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

(21) Appl. No.: 09/438,338

(22) Filed: Nov. 19, 1999

(51) Int. Cl.[7] ................................................. F16K 11/02
(52) U.S. Cl. ....................................... 137/625.41; 137/312
(58) Field of Search ............................... 137/625.41, 312

(56) References Cited

U.S. PATENT DOCUMENTS

| | | | |
|---|---|---|---|
| 1,708,273 | * 4/1929 | Larsen | 137/312 |
| 2,751,930 | * 6/1956 | Redner | 137/625.41 |
| 4,410,003 | * 10/1983 | Sandling | 137/312 |
| 5,954,235 | 9/1999 | Schroeder et al. | 222/129.1 |

* cited by examiner

*Primary Examiner*—John Fox
(74) *Attorney, Agent, or Firm*—Christopher L. Makay

(57) ABSTRACT

A dispensing valve mounting assembly includes a housing having a beverage syrup inlet communicating with a beverage syrup outlet and a first mixing fluid inlet and a second mixing fluid inlet communicating with a mixing fluid outlet. The dispensing valve mounting assembly further includes a beverage syrup valve assembly disposed in the housing. The beverage syrup valve assembly is movable from a first position that interrupts communication between the beverage syrup inlet and the beverage syrup outlet to a second position that permits communication between the beverage syrup inlet and the beverage syrup outlet. The dispensing valve mounting assembly still further includes an inlet switch assembly disposed in the housing. The inlet switch assembly moves among a first position that interrupts communication between both the first mixing fluid inlet and the second mixing fluid inlet and the mixing fluid outlet, a second position that interrupts communication between the second mixing fluid inlet and the mixing fluid outlet and permits communication between the first mixing fluid inlet and the mixing fluid outlet, and a third position interrupts communication between the first mixing fluid inlet and the mixing fluid outlet and permits communication between the second mixing fluid inlet and the mixing fluid outlet.

4 Claims, 3 Drawing Sheets

DISPENSING VALVE MOUNTING ASSEMBLY

BACKGROUND OF THE INVENTION

1. Field of the Invention

The present invention generally relates to beverage dispensers and, more particularly, but not by way of limitation, to an improved dispensing valve mounting assembly for use in beverage dispensers, that allows for mixing fluids, such as plain and carbonated water, to be interchanged without having to disassemble and/or depressurize the beverage dispenser.

2. Description of the Related Art

Typically, a beverage dispenser features several dispensing valves whereby each dispensing valve is assigned a single drink flavor. Several dispensing valves enable a beverage dispenser to feature a wide variety of drink flavors. When a particular dispensing valve is activated, beverage syrup for a desired drink flavor is mixed with either carbonated water, such as when cola is required, or plain water, such as when punch is required, before being dispensed from the valve. Thus, by placing a cup accordingly and activating a valve, the beverage dispenser dispenses the resulting drink of choice into a cup below.

Market demand often requires owners of beverage dispensers to reconfigure dispensing valves to accommodate new varieties of drink flavors or more than one dispensing valve featuring the same and, typically, the most popular drink flavor. For example, when diet cola is in high demand and punch is in low demand, a beverage dispenser once featuring diet cola, cola, and punch dispensing valves can be reconfigured to a beverage dispenser with two diet cola valves and one cola valve in an attempt to satisfy the greater demand for diet cola. In this manner, the variety of drink flavors offered by a beverage dispenser is continuously changing with changing market demand.

Unfortunately, increasing the frequency of drink flavor change increased the frequency of performing the already time consuming and laborious process of reconfiguring a beverage dispenser. In the past, each dispensing valve was connected directly to a beverage syrup source as well as directly to either a carbonated or a plain water source. As such, switching between a carbonated drink flavor and a plain water or "non-carbonated" drink flavor, such as between diet cola and punch involved disconnecting a dispensing valve from its respective sources, which were typically positioned in hard-to-reach areas within the beverage dispenser. Thus, gaining access to the carbonated and plain water sources often required disassembling much of the beverage dispenser; and, upon reassembly, pressure and flow rates had to be reset across the connection between the dispensing valve and respective sources.

The introduction of a dispensing valve mounting assembly, cooperatively linked between the dispensing valve and the beverage syrup source and carbonated water or plain water sources, greatly reduced the need to disassemble the beverage dispenser to gain access to the carbonated and plain water sources as well as reduced the need to reset pressure and flow rates upon reassembly of the beverage dispenser. In effect, a dispensing valve mounting assembly remains cooperatively linked to a beverage syrup source as well as to either a carbonated or a plain water source, especially when a dispensing valve is detached from the dispensing valve mounting assembly such as during cleaning or maintenance.

In particular, current dispensing valve mounting assemblies feature two outlets, one outlet for delivering beverage syrup to a dispensing valve and one outlet for delivering either plain or carbonated water to the dispensing valve. Current dispensing valve mounting assemblies, however, only feature two inlets, one inlet connected to a beverage syrup source and one inlet connected to either a plain or a carbonated water source. Thus, because a dispensing valve mounting assembly provides only one inlet for both plain and carbonated water, interchanging between carbonated and non-carbonated drink flavors still requires disassembling the beverage dispenser to gain access to the carbonated and plain water sources as well as resetting pressure and flow rates upon reassembly of the beverage dispenser similar to when there is no dispensing valve mounting assembly. For example, when reconfiguring a dispensing valve featuring a carbonated drink flavor to accommodate a non-carbonated drink flavor, any suitable connecting means for delivering carbonated water from the carbonated water source would first need to be disconnected from the dispensing valve mounting assembly inlet and then sealed off to retain pressure for future use. Any suitable connecting means for delivering plain water from the plain water source would then need to be connected to the inlet in a manner so that a desired pressure across the connection is maintained. Thus, current dispensing valve mounting assemblies cannot easily interchange between plain and carbonated water.

Accordingly, there is a long felt need for a dispensing valve mounting assembly that permits easy interchange between plain and carbonated water without disassembling a beverage dispenser as well as resetting the pressure and flow rates across the beverage dispenser.

SUMMARY OF THE INVENTION

In accordance with the present invention, a dispensing valve mounting assembly includes a housing having a beverage syrup inlet communicating with a beverage syrup outlet and a first mixing fluid inlet and a second mixing fluid inlet communicating with a mixing fluid outlet. The housing includes a mixing fluid cavity between the first mixing fluid inlet and the second mixing fluid inlet and the mixing fluid outlet. The housing further includes a beverage syrup cavity between the beverage syrup inlet and the beverage syrup outlet.

The dispensing valve mounting assembly further includes an inlet switch assembly. The inlet switch assembly includes a selector seal disposed in the mixing fluid cavity of the housing. The selector seal includes a first guide hole communicating with the first mixing fluid inlet, a second guide hole communicating with the second mixing fluid inlet, and an exit guide hole communicating with the mixing fluid outlet. The selector seal further includes a vent slot between the first guide hole and the second guide hole for delivering leaked first and second mixing fluid exterior to the housing.

The selector seal further includes an inlet selector disposed in the selector seal. The inlet selector includes a selection passageway having a selection opening and a selection exit aligned with the exit guide hole of the selector seal. The inlet selector is movable among a first position that interrupts alignment between the selection opening of the selection passageway and both the first guide hole and second guide hole of the selector seal, a second position that aligns the selection opening of the selection passageway with the first guide hole of the selector seal, and a third position that aligns the selection opening of the selection passageway with the second guide hole of the selector seal. The inlet selector further includes a groove for communicating leaked first and second mixing fluid to the vent slot.

The dispensing valve mounting assembly still further includes a beverage syrup valve. The beverage syrup valve includes a turn-key valve disposed in the beverage syrup cavity. The turn-key valve includes a selection passageway having a selection opening and a selection exit. The turn-key valve is movable from a first position that interrupts alignment between the selection opening of the selection passageway and the beverage syrup inlet of the housing and the selection exit of the selection passageway and the beverage syrup outlet of the housing to a second position that aligns the selection opening of the selection passageway and the beverage syrup inlet of the housing and the selection exit of the selection passageway and the beverage syrup outlet of the housing.

It is therefore an object of the present invention to provide a dispensing valve mounting assembly for use in beverage dispensers, that allows for mixing fluids, such as plain and carbonated water, to be interchanged without having to disassemble and/or depressurize the beverage dispenser.

It is a further object of the present invention to provide a dispensing valve mounting assembly that vents leaked mixing fluid to its exterior to prevent contamination between mixing fluids.

Still other objects, features, and advantages of the present invention will become evident to those of ordinary skill in the art in light of the following.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. The figures are not necessarily to scale, and some features may be exaggerated to show details of particular components or steps.

Figure 1:
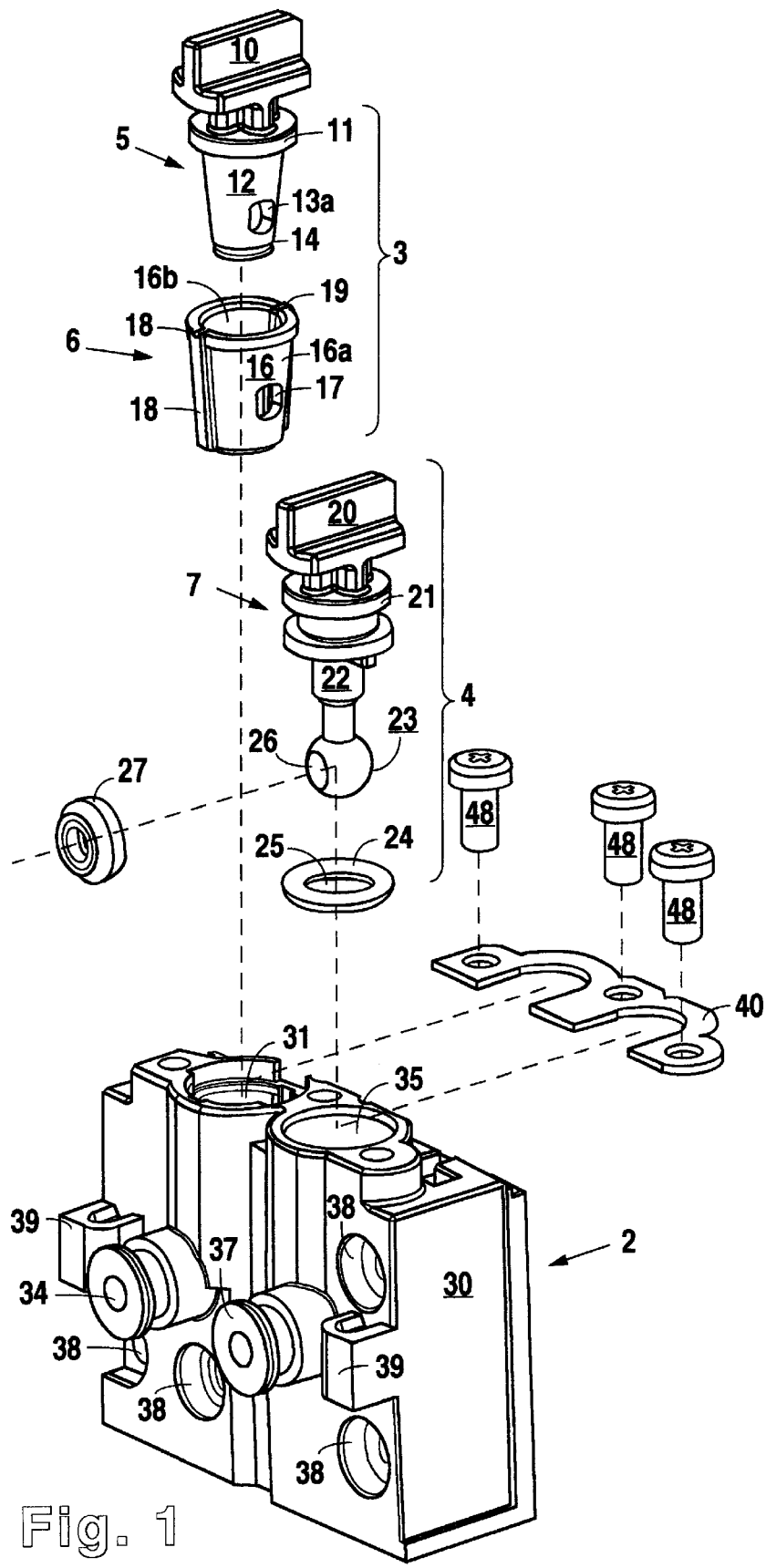
FIG. 1 is an exploded view illustrating an improved dispensing valve mounting assembly.
Figure 2:
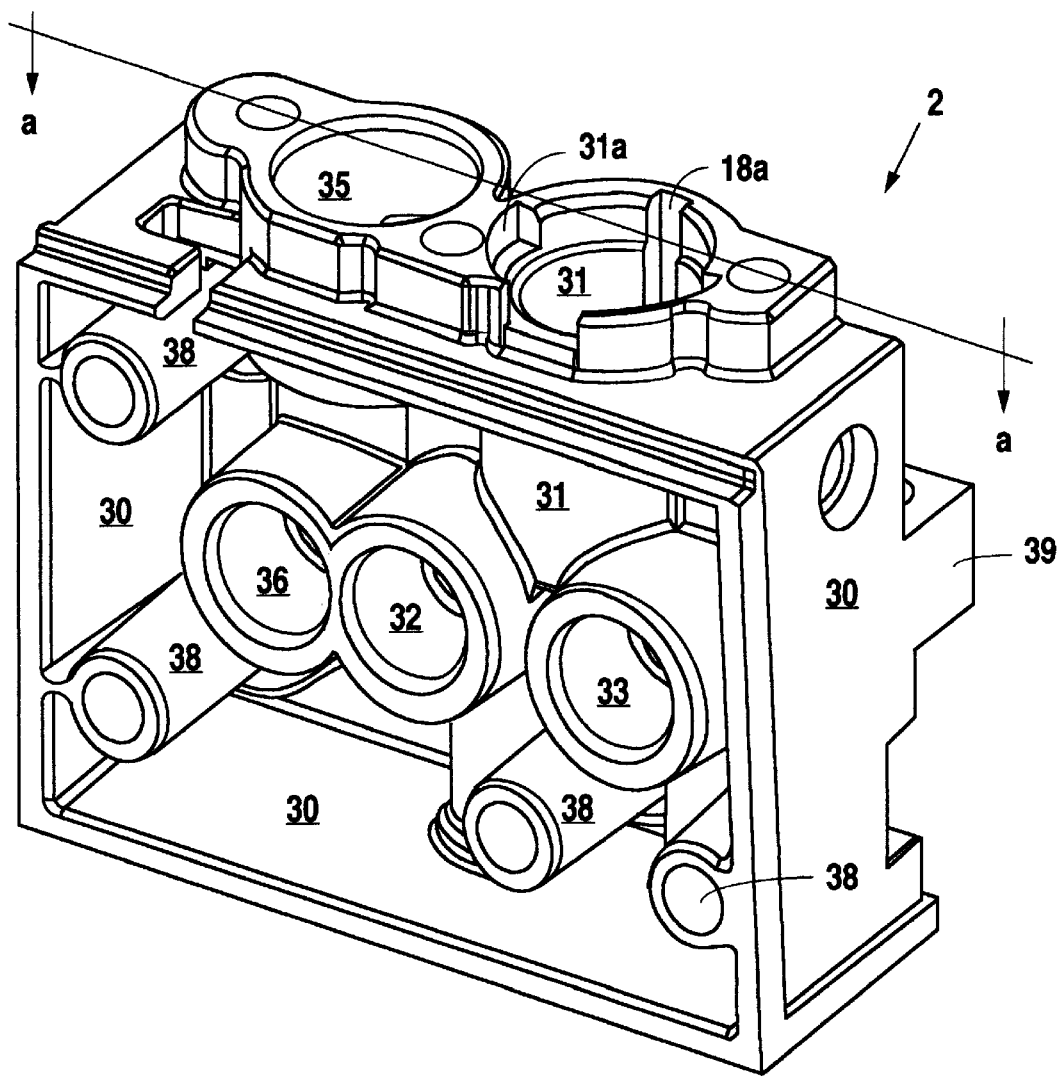
FIG. 2 is a perspective view illustrating the preferred inlet embodiment for the improved dispensing valve mounting assembly.
Figure 3:
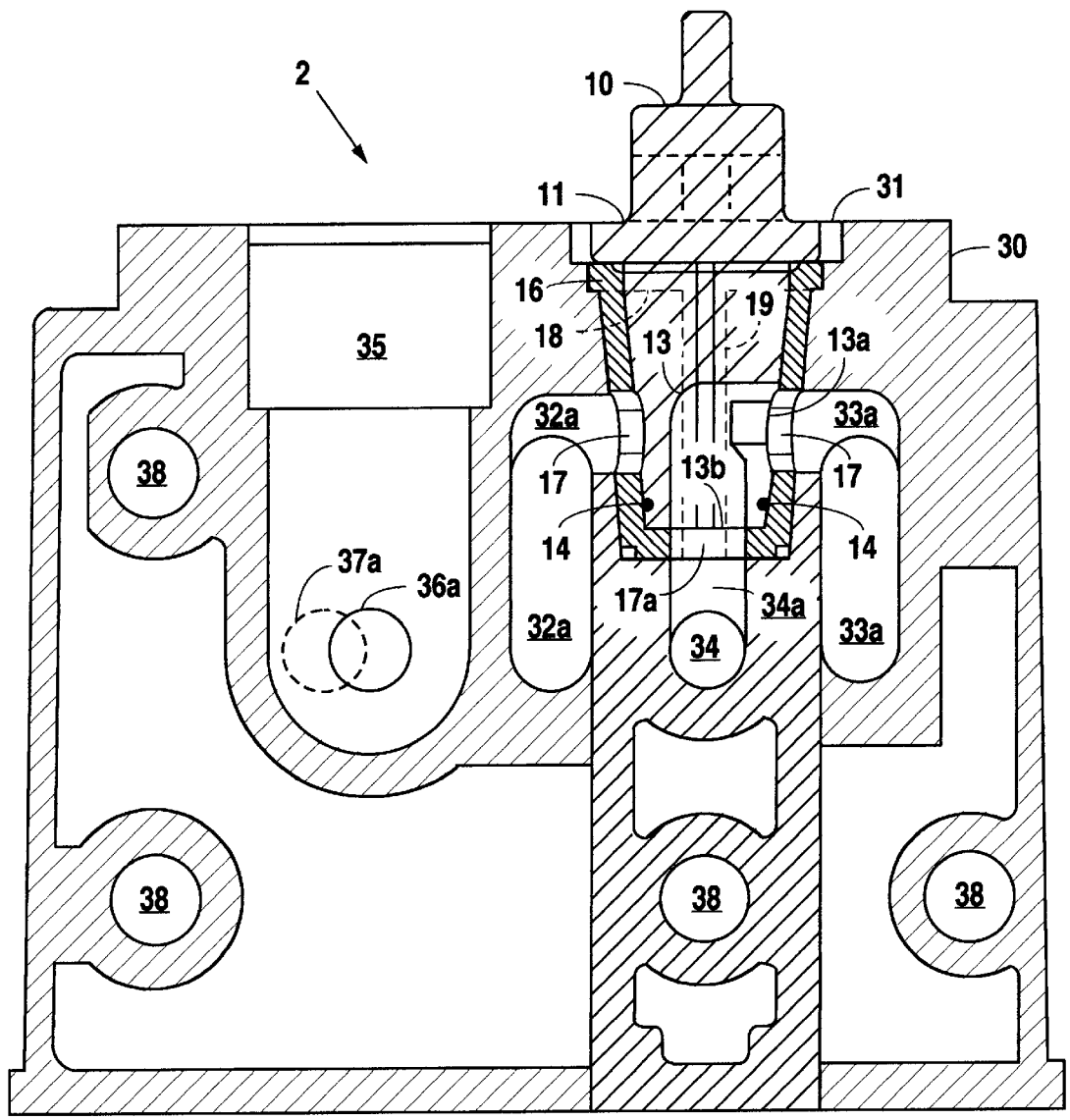
FIG. 3 is a cross-section taken along the lines a,a of FIG. 2 illustrating the preferred inlet embodiment for the improved dispensing valve mounting assembly.

As illustrated in FIGS. 1–3, dispensing valve mounting assembly 1 includes a block 2, an inlet switch assembly 3, and a beverage syrup valve assembly 4. Furthermore, the inlet switch assembly 3 and the beverage syrup valve assembly 4 are maintained within the block 2 by a securing plate 40 that is secured to the block 2 using fasteners 48.

The block 2 defines a housing 30 which, in this preferred embodiment, has a beverage syrup inlet 36, a first mixing fluid or carbonated water inlet 32, and a second mixing fluid or plain water inlet 33 formed integrally therein, thereby creating one piece. It should be emphasized that those skilled in the art will recognize other configurations for the block and the beverage syrup, carbonated water, and plain water inlets. Illustratively, the block could comprise two separate components, with a first component including the beverage syrup side and a second component including the mixing fluid side. The beverage syrup inlet 36, the carbonated water inlet 32, and the plain water inlet 33 are communicatively linked with a beverage syrup source (not shown), a carbonated water source (not shown), and a plain water source (not shown), respectively, using any suitable connecting means, such as conduit. Thus, in operation, beverage syrup, carbonated water, and plain water are delivered to their respective inlets under a preset pressure and at a controlled rate of flow. Although this preferred embodiment discloses a beverage syrup and multiple mixing fluids, those of ordinary skill in the art will recognize that multiple beverage syrups or any beverage type requiring interchanging may be used.

In this preferred embodiment, a beverage syrup outlet 37 and a mixing fluid or plain/carbonated water outlet 34 are integrally formed within housing 30, thereby creating one piece. The beverage syrup outlet 37 and plain/carbonated water outlet 34 are communicatively linked to a dispensing valve (not shown) and, further support the dispensing valve on the block 2. In this preferred embodiment, a pair of grasping prongs 39, integrally formed with housing 30, are provided to aid the beverage syrup outlet 37 and the plain/carbonated water outlet 34 in coupling of the dispensing valve with the housing 30. In addition, in this preferred embodiment, an array of connector members 38 are formed integrally with housing 30, thereby creating one piece. The connector members 38 are provided to facilitate the coupling of the dispensing valve mounting assembly 1 with the beverage dispenser.

In operation, beverage syrup as well as plain or carbonated water are delivered from the plain/carbonated water and beverage syrup outlets 34, 37, respectively, to the dispensing valve. A dispensing valve mounting assembly thus allows for a dispensing valve to be detached therefrom, especially during cleaning or maintenance, without resetting pressure and flow rates upon reattachment as well as without disassembling a beverage dispenser.

In this preferred embodiment, housing 30 defines both a beverage syrup cavity 35, which receives the beverage syrup valve assembly 4 therein, and a mixing fluid or plain/carbonated water cavity 31, which receives the inlet switch assembly 3 therein. The beverage syrup cavity 35 is communicatively linked with the beverage syrup inlet 36, whereby beverage syrup flows from the beverage syrup inlet 36 through an opening 36a provided by the beverage syrup cavity 35 and formed within housing 30. (See FIG. 3). In addition, the beverage syrup cavity 35 is communicatively linked with the beverage syrup outlet 37, whereby beverage syrup flows from the beverage syrup cavity 35 through an opening 37a provided by the beverage syrup cavity 35 and formed within housing 30. Ultimately, the flow of beverage syrup through the beverage syrup cavity 35 is dictated by the positioning of the beverage syrup valve assembly 4 with respect to the openings 36a, 37a.

In a similar manner, the plain/carbonated water cavity 31 is communicatively linked to both the carbonated water inlet 32 and the plain water inlet 33. In particular, carbonated water flows from the carbonated water inlet 32 through a carbonated water channel 32a defined by housing 30. Likewise, plain water flows from the plain water inlet 33 through a plain water channel 33a defined by housing 30. It should be added that copper conduit often delivers plain water to beverage dispensers. In this instance where copper conduit is employed, carbonated water must flow through its own pathway, independently from a plain water pathway, due to potentially bio-hazardous byproducts which result from carbonated water chemically reacting with copper. As is discussed further below, dispensing valve mounting assembly 1 is configured to, but is not limited to, compensate for instances where copper conduit is used.

As such, the plain/carbonated water cavity 31 is communicatively linked with the plain/carbonated water outlet 34, whereby plain or carbonated water flows from the plain/carbonated water cavity 31 through an exit channel 34a defined by housing 30. Ultimately, the flow of either plain or carbonated water through the plain/carbonated water cavity 31 is dictated by the positioning of the inlet switch assembly 3 with respect to either the carbonated water channel 32a and the exit channel 34a or the plain water channel 33a and the exit channel 34a.

The inlet switch assembly 3 includes a selector seal 6 and an inlet selector 5 disposed within the selector seal 6. The selector seal 6, in turn, includes a body 16 having an exterior surface 16a and an interior surface 16b. In this preferred embodiment, the selector seal 6 includes a pair of opposing guide holes 17 defined by body 16. (See FIG. 3). In this preferred embodiment, the selector seal 6 includes a pair of opposing protrusion 18 formed by exterior surface 16a. (See FIG. 1). Each protrusion 18, in turn, defines a vent slot 19 formed along interior surface 16b. In this preferred embodiment, selector seal 6 includes an exit guide hole 17a defined along the bottom portion of the selector seal 6. (See FIG. 3).

Accordingly, the selector seal 6 is positioned within the plain/carbonated water cavity 31 such that one guide hole 17 is in communication with the carbonated water channel 32a, the opposing guide hole 17 is in communication with the plain water channel 33a, and the exit guide hole 17a is in communication with the exit channel 34a. In addition, a pair of opposing recesses 18a defined by the surface of the plain/carbonated water cavity 31 are provided to accommodate the pair of opposing groves 18 matedly positioned therein. (See FIG. 2).

The inlet selector 5 includes a selector body 12 and a selector turn dial 10 positioned above the selector body 12 to allow rotational movement of the selector body 12 in tandem with the manual engagement of the selector turn dial 10. (See FIG. 1). In particular, the inlet selector 5 further includes a base 11 that is secured, using any suitable means, to the selector body 12 and to the selector turn dial 10. In operation, upon manual engagement of the selector turn dial 10, the base 11 travels against a guide slot 31 a defined by the upper portion of the plain/carbonated water cavity 31. In this manner, the rotational movement of the inlet selector 5 is restricted by the length of the guide slot 31 a so that, ultimately, carbonated water and plain water within their respective inlets, 32, 33, will not be intermixed, thus, reducing the risk for the creation of potentially bio-hazardous byproducts. (See FIG. 2).

The inlet selector 5 includes a selection passageway 13 having one selection opening 13a and one selection exit 13b. Upon manual engagement of the selector turn dial 10, the selection opening 13a operatively aligns with either one of the two guide holes 17 to thus complete a path for either plain or carbonated water to pass therethrough and flow out the selection exit 13b, through the exit guide hole 17a, and to the exit channel 34a. (See FIG. 3). In effect, the selection passageway 13 allows for plain and carbonated water to be easily interchanged within the dispensing valve mounting assembly 1 without having to disassemble and depressurize the entire beverage dispenser.

Furthermore, the inlet selector 5 includes a collector groove 14 formed in the bottom portion of the selector body 12 and defined by the bottom portion of the selector body 12 and the selector seal 6. The collector groove 14, in the event of a leak, acts to direct any residual plain and/or carbonated water that may have seeped between the inlet selector 5 and the selector seal 6 toward each vent slot 19. Residual plain and/or carbonated water travels up the vent slot 19, under pressure, until it has vented and escaped into the atmosphere. In particular, the collector groove 14 is coupled with the lower interior surface 16b to form an integral collection chamber (not shown) through which residual plain and/or carbonated water is directed toward and out each vent slot 19. The collector groove 14 acts to isolate plain water and carbonated water from one another to prevent cross-contamination so that carbonated water cannot seep back into the plain water inlet 33 and, thus, increase the risk of creating bio-hazardous byproducts.

The beverage syrup valve assembly 4 includes a turn-key valve 7, an o-ring seat 24 defining an aperture 25 through which the turn-key valve 7, in part, rests, and a gasket connector 27 intermediate turn-key valve 7 and opening 37a to facilitate the flow of beverage syrup therethrough. (See FIGS. 1 and 3). The turn-key valve 7 includes a beverage syrup valve body 22 and a beverage syrup turn dial 20 positioned above the beverage syrup valve body 22 to allow rotational movement of the beverage syrup valve body 22 in tandem with the manual engagement of the beverage syrup turn dial 20. (See FIG. 1). The turn-key valve 7 further includes a base 21 that is secured, using any suitable means, to the beverage syrup valve body 22 and to the beverage syrup turn dial 20. In operation, upon manual engagement of the beverage syrup turn dial 20, the base 21 travels against the surface defined by the upper portion of the beverage syrup cavity 35. In this manner, the rotational movement of the turn-key valve 7 allows for a passageway between the beverage syrup inlet 36 and beverage syrup outlet 37 to be selectively opened and closed.

In particular, the turn-key valve 7 includes a ball valve 23 disposed at the end of the beverage syrup valve body 22. The ball valve 23 defines a cavity passageway 26. Upon manual engagement of the beverage syrup turn dial 20, the cavity passageway 26 operatively aligns with the opening 36a for the beverage syrup inlet 36 and with the opening 37a for the beverage syrup outlet 37 to thus complete a path for beverage syrup to pass therethrough. In a similar manner, the path can be closed by manually adjusting the turn-key valve 7 so that the cavity passageway 26 and openings 36a and 37a are operatively out of alignment such that beverage syrup can no longer flow therethrough.

Illustratively, for a dispensing valve featuring punch drink flavor, the dispensing valve mounting assembly 1 operates in the following manner. Plain water is delivered across any suitable connecting means, such as conduit, to the plain water inlet 33 from the plain water source, by pumps (not shown) located within the beverage dispenser.

Plain water is directed from the plain water inlet 33 across the plain water inlet channel 33a to guide hole 17 defined by selector seal 6. As such, plain water flows from guide hole 17, through selection opening 13a, and across the selection passageway 13 of inlet selector 5. In this illustration, as clearly shown in FIG. 3, it should be emphasized that the selection passageway 13 of inlet selector 5 has been positioned so that it is in communication with the plain water channel 33a. Moreover, any residual plain water is allowed to depressurize and bleed-out from the dispensing valve mounting assembly 1, via the collector groove 14 and vent slot 19 configuration of the inlet switch assembly 3. For carbonated beverages, carbonated water would vent in the same manner as described for plain water.

Accordingly, plain water flows from selection passageway 13, through selection exit 13b, out exit guide hole 17a of selector seal 6, and into exit channel 34a. Plain water is directed through exit channel 34a, out plain/carbonated water outlet 34, and into the dispensing valve where plain water is mixed with punch-flavored beverage syrup to form the desired punch beverage.

As plain water is delivered from the plain water source, punch-flavored beverage syrup is delivered across any suitable connecting means, such as conduit, to the beverage syrup inlet 36 from the beverage syrup source, by pumps (not shown) located within the beverage dispenser. Punch-flavored beverage syrup is directed from the beverage syrup inlet 36 to the opening 36a. In this illustration, as clearly shown in FIG. 3, it should be emphasized that turn-key valve 7 is communicatively linked with the opening 36a to the cavity passageway 26 and with the opening 37a to the beverage syrup outlet to thus complete a path for beverage syrup to pass therethrough. As such, punch-flavored beverage syrup is directed from opening 36a across the cavity passageway 26, and to opening 37a. Punch-flavored beverage syrup is directed through the opening 37a, out beverage syrup outlet 37, and into the dispensing valve that is coupled with the dispensing valve mounting assembly 1.

As discussed above, a critical feature of a dispensing valve mounting assembly is to enable switching between a carbonated and a non-carbonated drink flavor without depressurizing and disassembling the entire beverage dispenser. Illustratively, to interchange punch, a beverage requiring plain water and punch-flavored beverage syrup, with root beer, a beverage requiring carbonated water and root beer-flavored beverage syrup, the dispensing valve mounting assembly 1 is reconfigured in the following manner.

To interchange punch-flavored beverage syrup for root beer-flavored beverage syrup, turn-key valve 7 is manually rotated so that beverage syrup can no longer operatively flow across cavity passageway 26 to effectively close cavity passageway 26. The punch-flavored beverage syrup source is exchanged for a root beer-flavored beverage syrup source. The turn-key valve 7 is manually rotated so that beverage syrup can operatively flow across cavity passageway 26 to effectively open cavity passageway 26. The dispensing valve is then activated until a consistency of root beer-flavored syrup is obtained so as to initially flush-out residual punch-flavored beverage syrup entirely from the dispensing valve mounting assembly and beverage dispenser.

To interchange plain water for carbonated water, inlet selector 3 is manually rotated until selection passageway 13 is in communication with carbonated water channel 32a and is no longer in communication with plain water channel 33a. Currently, to interchange plain for carbonated water, beverage dispensers with dispensing valve mounting assemblies are disassembled to gain access to the plain and carbonated water sources and their respective connecting means to the block 2. The connecting means to the plain water source is sealed off to ensure that pressure is maintained until such connecting means is once again operational. Accordingly, as the selection opening 13a rotationally advances from the plain water channel 33a to the carbonated water channel 32a, the surface of the selector body 12 where the selection opening 13a is not present seals off plain water within the plain water channel 33a for future use without the need for disassembling the beverage dispenser. Furthermore, leaks and seepage of carbonated and/or plain water from the carbonated and plain water channels 32a, 33a, respectively, are accounted for and disposed of by the collector groove 14 and vent slot 19 configuration of the inlet switch assembly 3.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

What is claimed is:

1. A dispensing valve mounting assembly, comprising:

a housing including a first fluid inlet and a second fluid inlet communicating with a fluid outlet, wherein the housing includes a fluid cavity between the first fluid inlet and the second fluid inlet and the fluid outlet;

an inlet switch assembly disposed in the housing, wherein the inlet switch assembly in a first position interrupts communication between both the first fluid inlet and the second fluid inlet and the fluid outlet, in a second position interrupts communication between the second fluid inlet and the fluid outlet and permits communication between the first fluid inlet and the fluid outlet, and in a third position interrupts communication between the first fluid inlet and the fluid outlet and permits communication between the second fluid inlet and the fluid outlet; and the inlet switch assembly comprising:

a selector seal disposed in the fluid cavity of the housing, the selector seal including a first guide hole communicating with the first fluid inlet, a second guide hole communicating with the second fluid inlet, and an exit guide hole communicating with the fluid outlet, an inlet selector disposed in the selector seal and including a selection passageway having a selection opening and a selection exit aligned with the exit guide hole of the selector seal, wherein the inlet selector in a first position interrupts alignment between the selection opening of the selection passageway and both the first guide hole and second guide hole of the selector seal, in a second position aligns the selection opening of the selection passageway with the first guide hole of the selector seal, and in a third position aligns the selection opening of the selection passageway with the second guide hole of the selector seal, and the selector seal including a protrusion defining a vent slot between the first guide hole and the second guide hole for delivering leaked first and second fluid exterior to the housing.

2. The dispensing valve mounting assembly according to claim 1, wherein the inlet selector includes a groove for communicating leaked first and second fluid to the vent slot.

3. The dispensing valve mounting assembly according to claim 1, wherein the housing includes a recess adjacent to the mixing fluid cavity for receiving the protrusion of the selector seal.

4. The dispensing valve mounting assembly according to claim 1, wherein the inlet selector comprises a selector turn dial connected to a selector body.

* * * * *